United States Patent
Ishii et al.

(10) Patent No.: US 9,988,315 B2
(45) Date of Patent: *Jun. 5, 2018

(54) SINTERED BODY AND CUTTING TOOL INCLUDING THE SAME

(71) Applicants: Sumitomo Electric Industries, Ltd., Osaka-shi (JP); SUMITOMO ELECTRIC HARDMETAL CORP., Itami-shi (JP)

(72) Inventors: Akito Ishii, Itami (JP); Takashi Harada, Itami (JP); Katsumi Okamura, Itami (JP); Satoru Kukino, Itami (JP)

(73) Assignees: Sumitomo Electric Industries, Ltd., Osaka-shi (JP); SUMITOMO ELECTRIC HARDMETAL CORP., Itami-shi (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/504,464

(22) PCT Filed: Apr. 20, 2016

(86) PCT No.: PCT/JP2016/062460
§ 371 (c)(1),
(2) Date: Feb. 16, 2017

(87) PCT Pub. No.: WO2016/171155
PCT Pub. Date: Oct. 27, 2016

(65) Prior Publication Data
US 2017/0233295 A1  Aug. 17, 2017

(30) Foreign Application Priority Data

Apr. 20, 2015 (JP) .................................. 2015-086080

(51) Int. Cl.
| | | |
|---|---|---|
| *C04B 35/5831* | (2006.01) | |
| *B23B 27/14* | (2006.01) | |
| *B23B 51/00* | (2006.01) | |
| *B23C 5/16* | (2006.01) | |
| *C04B 35/64* | (2006.01) | |

(52) U.S. Cl.
CPC ........ *C04B 35/5831* (2013.01); *B23B 27/148* (2013.01); *B23B 51/00* (2013.01); *B23C 5/16* (2013.01); *C04B 35/64* (2013.01); *B23B 2222/14* (2013.01); *B23B 2224/04* (2013.01); *B23B 2226/125* (2013.01); *B23C 2222/14* (2013.01); *B23C 2224/04* (2013.01); *B23C 2226/125* (2013.01); *B23C 2228/49* (2013.01); *C04B 2235/3217* (2013.01); *C04B 2235/3225* (2013.01); *C04B 2235/3246* (2013.01); *C04B 2235/386* (2013.01); *C04B 2235/5436* (2013.01); *C04B 2235/5445* (2013.01); *C04B 2235/6567* (2013.01)

(58) Field of Classification Search
CPC .................................................. C04B 35/5831
See application file for complete search history.

(56) References Cited

U.S. PATENT DOCUMENTS

| | | | | |
|---|---|---|---|---|
| 8,814,965 | B2 * | 8/2014 | Yokoshi | ................ C04B 35/119 51/293 |
| 8,962,505 | B2 | 2/2015 | Okamura et al. | |
| 8,993,132 | B2 * | 3/2015 | Okamura | .............. B23B 27/148 419/13 |
| 9,181,135 | B2 * | 11/2015 | Malik | .................. C04B 35/5611 |
| 2010/0313489 | A1 | 12/2010 | Teramoto et al. | |
| 2012/0208006 | A1 | 8/2012 | Okamura et al. | |
| 2012/0304544 | A1 | 12/2012 | Yokoshi | |
| 2012/0329632 | A1 | 12/2012 | Malik et al. | |
| 2013/0079215 | A1 | 3/2013 | Okamura et al. | |
| 2017/0197885 | A1 * | 7/2017 | Okamura | ............ C04B 35/5831 |
| 2017/0197886 | A1 * | 7/2017 | Danda | ................. C04B 35/5831 |

FOREIGN PATENT DOCUMENTS

| | | |
|---|---|---|
| EP | 2520555 A1 | 11/2012 |
| JP | 64-065073 A | 3/1989 |
| JP | 2013-039668 A | 2/2013 |
| JP | 2014-520063 A | 8/2014 |
| JP | 2014-189474 A | 10/2014 |
| WO | 2008/087940 A1 | 7/2008 |
| WO | 2011/059020 A1 | 5/2011 |
| WO | 2012/029440 A1 | 3/2012 |
| WO | 2012/057183 A1 | 5/2012 |

(Continued)

OTHER PUBLICATIONS

Yamamoto et al., "Fabrication of High Strength and Toughness Ceramics Using Pulsed Electric-Current Pressure Sintering of $ZrO_2(Y_2O_3)$—$Al_2O_3$ Solid Solution Powders Prepared by the Neutralization Co-precipitation Method," J. Jpn. Soc. Powder Metallurgy, vol. 60, No. 10, p. 428-435, 2013.
Shibaya et al., "Fabrication of $ZrO_2$ Solid Solution Ceramics Containing $Al_2O_3$ Having High Bending Strength ($\sigma b \geq 1$ GPa) and High Fracture Toughness (KIC≥20 MPa●m1/2) Simultaneously by Pulsed Electric-current Pressure Sintering (PECPS),"J. Jpn. Soc. Powder Powder Metallurgy, vol. 58, No. 12, p. 727-732, 2011.
International Search Report in counterpart International Application No. PCT/JP2016/062460, dated May 31, 2016.
International Search Report in International Application No. PCT/JP2016/055376, dated Apr. 5, 2016.
U.S. Appl. No. 15/327,214, filed Jan. 18, 2017 [Provided in IFW].
Notice of Allowance issued in U.S. Appl. No. 15/327,214 dated Sep. 29, 2017 [Provided in IFW].

(Continued)

*Primary Examiner* — Karl E Group
(74) *Attorney, Agent, or Firm* — Venable LLP; Michael A. Sartori; Kerri M. Patterson

(57) ABSTRACT

A sintered body of the present invention is a sintered body including a first material and cubic boron nitride. The first material is partially-stabilized $ZrO_2$ including 5 to 90 volume % of $Al_2O_3$ dispersed in crystal grain boundaries or crystal grains of partially-stabilized $ZrO_2$.

11 Claims, No Drawings

(56) References Cited

FOREIGN PATENT DOCUMENTS

WO    2012/057184  A1    5/2012
WO    2012/153645  A1    11/2012

OTHER PUBLICATIONS

Notice of Allowance issued in U.S. Appl. No. 15/327,214 dated Feb. 7, 2018.

* cited by examiner

SINTERED BODY AND CUTTING TOOL INCLUDING THE SAME

TECHNICAL FIELD

The present invention relates to a sintered body and a cutting tool including the same.

BACKGROUND ART

A sintered body including cubic boron nitride (hereinafter also denoted as "cBN") as well as $Al_2O_3$, a Zr compound and the like has been conventionally used in a tool such as a cutting tool (International Publication No. 2008/087940 (PTD 1), International Publication No. 2012/029440 (PTD 2) and Japanese Patent Laying-Open No. 2013-039668 (PTD 3)).

In addition, $ZrO_2$—$Al_2O_3$-based solid solution ceramics have been used in various types of ceramics components (International Publication No. 2012/153645 (PTD 4) and Japanese Patent Laying-Open No. 2014-189474 (PTD 5)).

CITATION LIST

Patent Document

PTD 1: International Publication No. 2008/087940
PTD 2: International Publication No. 2012/029440
PTD 3: Japanese Patent Laying-Open No. 2013-039668
PTD 4: International Publication No. 2012/153645
PTD 5: Japanese Patent Laying-Open No. 2014-189474

SUMMARY OF INVENTION

Technical Problem

It is known that when a sintered body including cBN as well as $Al_2O_3$, a Zr compound and the like is used as a cutting tool, the sintered body has excellent wear resistance in high-speed cutting of centrifugally cast iron. However, $Al_2O_3$ is a low toughness material, and thus, the sintered body may be chipped when the sintered body is used in high-speed and long-distance cutting. Therefore, improvement of chipping resistance has been sought.

The present invention has been made in light of the above-described circumstances, and an object of the present invention is to provide a sintered body having enhanced chipping resistance and excellent wear resistance in high-speed cutting.

Solution to Problem

A sintered body according to one embodiment of the present invention is a sintered body including a first material and cubic boron nitride. The first material is partially-stabilized $ZrO_2$ including 5 to 90 volume % of $Al_2O_3$ dispersed in crystal grain boundaries or crystal grains of partially-stabilized $ZrO_2$.

Advantageous Effects of Invention

According to the foregoing, a sintered body having enhanced chipping resistance and excellent wear resistance in high-speed cutting is obtained.

DESCRIPTION OF EMBODIMENTS

Description of Embodiment of the Present Invention

First, an embodiment of the present invention will be listed and described.

[1] A sintered body according to one embodiment of the present invention is a sintered body including a first material and cubic boron nitride, the first material being partially-stabilized $ZrO_2$ including 5 to 90 volume % of $Al_2O_3$ dispersed in crystal grain boundaries or crystal grains of partially-stabilized $ZrO_2$. This sintered body has enhanced chipping resistance and excellent wear resistance in high-speed cutting.

[2] The first material can be partially-stabilized $ZrO_2$ including 5 to 50 volume % of $Al_2O_3$ dispersed in crystal grain boundaries or crystal grains of partially-stabilized $ZrO_2$. As a result, enhanced chipping resistance in high-speed cutting is especially achieved.

[3] The first material can be partially-stabilized $ZrO_2$ including more than 50 volume % and not more than 70 volume % (exceeding 50 volume % and equal to or less than 70 volume %) of $Al_2O_3$ dispersed in crystal grain boundaries or crystal grains of partially-stabilized $ZrO_2$. As a result, excellent wear resistance is especially achieved.

[4] The first material can be partially-stabilized $ZrO_2$ including more than 70 volume % and not more than 90 volume % (exceeding 70 volume % and equal to or less than 90 volume %) of $Al_2O_3$ dispersed in crystal grain boundaries or crystal grains of partially-stabilized $ZrO_2$. As a result, excellent wear resistance is especially achieved.

[5] The $Al_2O_3$ is preferably a particle having a particle size of not larger than 1 μm. As a result, toughness of partially-stabilized $ZrO_2$ is enhanced.

[6] The $Al_2O_3$ is more preferably a particle having a particle size of not larger than 0.5 μm. As a result, toughness of partially-stabilized $ZrO_2$ is further enhanced.

[7] The $Al_2O_3$ is more preferably a particle having a particle size of not larger than 0.1 μm. As a result, toughness of partially-stabilized $ZrO_2$ is further enhanced.

[8] The sintered body preferably includes 20 to 80 volume % of the first material. As a result, a higher level of wear resistance and chipping resistance of the sintered body are achieved.

[9] The sintered body further includes a third phase, wherein the third phase is preferably at least one selected from the group consisting of aluminum oxide, magnesium oxide, cerium oxide, yttrium oxide, hafnium oxide, and ZrO. As a result, sinterability is enhanced and the strength of the sintered body is further enhanced.

[10] The sintered body further includes a fourth phase, wherein the fourth phase is preferably at least one compound composed of at least one element selected from the group consisting of a group 4 element, a group 5 element and a group 6 element in a periodic table, Al, and Si, and at least one element selected from the group consisting of carbon, nitrogen and boron. As a result, similarly, sinterability is enhanced and the strength of the sintered body is further enhanced.

[11] One embodiment of the present invention also relates to a cutting tool including any one of the sintered bodies described above. Since this cutting tool includes the sintered body described above, this cutting tool has enhanced chipping resistance and excellent wear resistance in high-speed cutting.

Details of Embodiment of the Present Invention

The embodiment of the present invention (hereinafter also denoted as "present embodiment") will be described in more detail below.

<Sintered Body>

It has been conventionally known that when a sintered body including cBN as well as $Al_2O_3$, a Zr compound and the like is used as a cutting tool, the sintered body has excellent wear resistance in high-speed cutting of centrifugally cast iron. However, $Al_2O_3$ is a low toughness material, and thus, the sintered body may be chipped when the sintered body is used in high-speed and long-distance cutting, which has been a problem to be solved.

However, the present inventor's research produced findings that when a sintered body composed of cBN and partially-stabilized $ZrO_2$ which is a high toughness material includes minute $Al_2O_3$ in a particular form of presence, the chipping resistance of the sintered body is greatly enhanced surprisingly. This is probably because the structure of partially-stabilized $ZrO_2$ is toughened by finely precipitated $Al_2O_3$ and this synergistically acts on the original properties of cBN to thereby enhance the chipping resistance greatly. Such sintered body also has excellent wear resistance.

A sintered body of the present embodiment obtained based on the above-described findings is a sintered body including a first material and cubic boron nitride, and the first material is partially-stabilized $ZrO_2$ including 5 to 90 volume % (not less than 5 volume % and not more than 90 volume %, and when the numerical range is expressed with "to" in the present application, the range is intended to include an upper limit value and a lower limit value) of $Al_2O_3$ dispersed in crystal grain boundaries or crystal grains of partially-stabilized $ZrO_2$.

As long as the above-described sintered body includes the first material and the cubic boron nitride, the sintered body may include another arbitrary component. Examples of another arbitrary component can include, but are not limited to, a third phase, a fourth phase and the like described below. In addition, as long as the sintered body shows a desired effect, the sintered body may include inevitable impurities. As a matter of course, the sintered body can be a sintered body including only the first material and the cubic boron nitride.

The components forming the above-described sintered body will be described below.

<First Material>

The first material is partially-stabilized $ZrO_2$ including 5 to 90 volume % of $Al_2O_3$ dispersed in crystal grain boundaries or crystal grains of partially-stabilized $ZrO_2$. In other words, the first material is a composite oxide including 5 to 90 volume % of $Al_2O_3$ dispersed in crystal grain boundaries or crystal grains of partially-stabilized $ZrO_2$.

Partially-stabilized $ZrO_2$ herein has the conventionally known meaning, and typically refers to $ZrO_2$ in which an oxide other than zirconia is entered into solid solution and thus oxygen vacancies in the structure decrease and the structure becomes stable and therefore the cubic crystals and the tetragonal crystals become stable or metastable even at room temperature. Examples of the above-described oxide can include calcium oxide, magnesium oxide, and a rare-earth oxide such as yttrium oxide. One type or two or more types of the above-described oxides can be included. An amount of the oxide other than zirconia entered into solid solution is approximately 1 to 4 mol % with respect to $ZrO_2$.

Partially-stabilized $ZrO_2$ described above includes 5 to 90 volume % of $Al_2O_3$ with respect to the whole of the first material. Attention is now focused on a contained amount of $Al_2O_3$. When the contained amount is 5 to 50 volume % with respect to the whole of the first material, high hardness, high strength and high toughness, which allow high-speed cutting of difficult-to-cut steel materials, are obtained. The more preferable contained amount in this case is 15 to 30 volume %. When the contained amount of $Al_2O_3$ is less than 5 volume %, the above-described properties are not obtained.

On the other hand, when the contained amount of $Al_2O_3$ is more than 50 volume % and not more than 90 volume %, the toughness decreases greatly while the wear resistance is enhanced, as compared with the case of the above-described contained amount. Namely, when the contained amount of $Al_2O_3$ is within this range, the chipping resistance equal to or greater than that of $Al_2O_3$ alone and the wear resistance equal to or greater than that in the case of using the first material including 5 to 50 volume % of $Al_2O_3$ are obtained in high-speed cutting of difficult-to-cut steel materials. When the contained amount is more than 50 volume % and not more than 70 volume %, the wear resistance is more suitably enhanced, as compared with when the contained amount is more than 70 volume % and not more than 90 volume %. When the contained amount of $Al_2O_3$ exceeds 90 volume %, the performance exceeding that of $Al_2O_3$ alone is not obtained.

Such $Al_2O_3$ is present in a manner of being dispersed in crystal grain boundaries or crystal grains of partially-stabilized $ZrO_2$. Namely, "present in a manner of being dispersed" means that fine-grained $Al_2O_3$ is present in the crystal grain boundaries or the crystal grains. Therefore, $Al_2O_3$ is preferably a particle (crystal grain) of not larger than 1 μm, more preferably a particle of not larger than 0.5 μm, and further preferably a particle of not larger than 0.1 μm. The toughness tends to become higher as the particle size becomes smaller, and thus, a lower limit of the particle size is not particularly limited. However, when the particle size becomes too small, the toughness of the substance itself decreases. Therefore, the particle size is preferably not smaller than 0.005 μm.

The particle size of such $Al_2O_3$ has a characteristic of varying depending on sintering conditions. Moreover, even under the same sintering conditions, the particle size of $Al_2O_3$ varies between the case of sintering only the first material and the case of mixing and sintering the first material and the cubic boron nitride. Namely, comparing the particle size of $Al_2O_3$ in the case of sintering only the first material with the particle size of $Al_2O_3$ in the case of mixing and sintering the first material and the cubic boron nitride, the latter particle size (i.e., the particle size of $Al_2O_3$ in the sintered body including the cubic boron nitride) is a fine particle size (crystal grain size) that is approximately one tenth as small as the former particle size (i.e., the particle size of $Al_2O_3$ in the case of only the first material), even when the same sintering conditions (such as temperature and pressure) are applied.

Therefore, a phenomenon of the particle size (crystal grain size) of $Al_2O_3$ becoming not larger than 0.1 μm is a unique phenomenon appearing when the first material and the cubic boron nitride are mixed and sintered. When the cubic boron nitride is not included, the particle size of $Al_2O_3$ never becomes not larger than 0.1 μm (normally exceeds 0.2 μm).

As described above, $Al_2O_3$ is finely dispersed in the first material and thus the toughness is dramatically enhanced. This is considered to result from toughening of the structure by $Al_2O_3$. In addition, $Al_2O_3$ can be present in one or both of the crystal grain boundaries and the crystal grains.

Namely, this means that a position of presence of $Al_2O_3$ is not limited to a particular location of partially-stabilized $ZrO_2$.

The particle size, the contained amount (volume %) and the position of presence of $Al_2O_3$ can be determined as follows. Specifically, CP (Cross Section Polisher) processing is performed on the sintered body with an ion beam, to thereby form a smooth cross section. Then, the cross section is observed with a scanning electron microscope (SEM), to thereby identify the position of presence of $Al_2O_3$. In addition, by binarization processing with image analysis software, an equivalent circle diameter and an area of $Al_2O_3$ are calculated, and this equivalent circle diameter is defined as the particle size and this area is defined as the contained amount.

A raw material of the first material of the present embodiment can be obtained by, for example, a neutralization co-precipitation method or a sol-gel method described below.

(Neutralization Co-Precipitation Method)

The neutralization co-precipitation method is a method including a step A and a step B described below. This method is described in, for example, the paper (J. Jpn. Soc. Powder Powder Metallurgy, Vol. 60, No. 10, P428-435) published in 2013.

Step A: a step of mixing a zirconium salt, a yttrium salt and an aluminum salt such that a molar ratio between zirconia ($ZrO_2$) and yttria ($Y_2O_3$) is 98.2:1.8 to 98.8:1.2 and a molar ratio between yttria-added zirconia and alumina ($Al_2O_3$) is 10:90 to 95:5, to thereby prepare a mixed solution. In the above, yttria ($Y_2O_3$) is described by way of example as the oxide entered into solid solution in zirconia ($ZrO_2$). However, the oxide is not limited thereto.

Step B: a step of adding alkali to the mixed solution obtained in step A above for neutralization, and co-precipitating zirconium, yttrium and aluminum, to thereby obtain a precipitate, and drying the precipitate, and thereafter, performing heat treatment at 650 to 750° C. for 7 to 12 hours and further performing calcination at 850 to 950° C. for 0.5 to 3 hours, to thereby prepare a $Y_2O_3$ stabilized $ZrO_2$—$Al_2O_3$ solid solution powder.

Examples of the zirconium salt in step A above can include zirconium oxychloride ($ZrOCl_2$), zirconium oxynitrate ($ZrO(NO_3)_2$) and the like. Examples of the yttrium salt can include yttrium chloride ($YCl_3$), yttrium nitrate ($Y(NO_3)_3$) and the like. Examples of the aluminum salt can include aluminum chloride ($AlCl_3$) and the like. Examples of a solvent for preparing the mixed solution can include nitric acid, hydrochloric acid and the like.

(Sol-Gel Method)

The sol-gel method is a method including a step X described below. This method is described in, for example, the paper (J. Jpn. Soc. Powder Powder Metallurgy, Vol. 58, No. 12, P727-732) published in 2011.

Step X: a step of preparing an amorphous solid solution powder composed of 5 to 90 mol % of $Al_2O_3$ and $ZrO_2$ having 0.3 to 1.7 mol % of $Y_2O_3$ added thereto (99.7 to 98.3 mol % of $ZrO_2$-0.3 to 1.7 mol % of $Y_2O_3$) by using the sol-gel method, and calcining the obtained amorphous solid solution powder at a temperature equal to or higher than a crystallization temperature, to thereby prepare a crystalline $ZrO_2$ solid solution powder.

(Other Methods)

The first material of the present embodiment can also be obtained by a method other than the above-described two methods. Specifically, partially-stabilized $ZrO_2$ and $Al_2O_3$ are mixed in a solvent such as ethanol with a pulverizer such as a bead mill or a ball mill, to thereby obtain slurry. Then, granulation is performed using this slurry, and the first material can thus be obtained. Granulation means is not particularly limited, and examples of the granulation means can include melt granulation, spray granulation and the like.

The strength of the granulated material (first material) thus obtained can be enhanced by the following method:

(1) sintering the granulated material in a heat treatment furnace (e.g., at 1000° C. in the vacuum for 3 hours); or (2) adding 10 mass % of a binder (e.g., PVB (polyvinyl butyral) which is a typical binder) to the above-described slurry in a precursor stage of the granulated material.

As described above, the first material can be obtained by various methods and a method for manufacturing the first material is not particularly limited.

The above-described first material is preferably contained in the sintered body at a rate of 20 to 80 volume %. When the rate is less than 20 volume %, the wear resistance and the chipping resistance may decrease. When the rate exceeds 80 volume %, the hardness may decrease and thus the wear resistance may decrease. The rate of the first material is more preferably 30 to 60 volume %.

In addition, the above-described first material preferably has an average particle size of 0.01 to 1 µm. When the average particle size is smaller than 0.01 µm, flocculation is likely to occur during mixing with other powders, and thus, poor sintering tends to occur. When the average particle size exceeds 1 µm, the strength tends to decrease due to grain growth during sintering. The average particle size is more preferably 0.1 to 0.5 µm.

The average particle size of the above-described first material can be obtained as follows. Specifically, CP (Cross Section Polisher) processing is performed on the sintered body with an ion beam, to thereby form a smooth cross section. Then, the cross section is observed with the scanning electron microscope (SEM). By binarization processing with the image analysis software, an equivalent circle diameter of the first material is calculated, and this equivalent circle diameter can be defined as the average particle size.

The compositions and content rates of the components forming the sintered body of the present embodiment, in addition to this first material, can be determined by a reflected electron image obtained by measuring the CP-processed surface with the scanning electron microscope (SEM), EDX (energy dispersive X-ray analysis), or Auger electron spectroscopy analysis.

<Cubic Boron Nitride>

The cubic boron nitride included in the sintered body of the present embodiment preferably has an average particle size of 0.1 to 5 µm. When the average particle size is smaller than 0.1 µm, flocculation is likely to occur during mixing with other powders, and thus, poor sintering tends to occur. When the average particle size exceeds 5 µm, the strength tends to decrease due to grain growth during sintering.

The particle size of the above-described cubic boron nitride is preferably uniform from the perspective of having no stress concentration and achieving a high strength. Therefore, the average particle size herein preferably shows normal distribution. When a particle having a large particle size and a particle having a small particle size are included, the stress concentrates on these particles and the strength decreases. Therefore, it is preferable that the average particle size shows normal distribution and is uniform.

The above-described cubic boron nitride is preferably contained in the sintered body at a rate of 20 to 80 volume %. When the rate is less than 20 volume %, the hardness may decrease and thus the wear resistance may decrease. When the rate exceeds 80 volume %, the wear resistance and the chipping resistance may decrease. The rate of the cubic boron nitride is more preferably 40 to 60 volume %.

The average particle size of the cubic boron nitride can be obtained as follows. Specifically, CP (Cross Section Polisher) processing is performed on the sintered body with an ion beam, to thereby form a smooth cross section. Then, the cross section is observed with the scanning electron microscope (SEM). By binarization processing with the image analysis software, an equivalent circle diameter of the cubic boron nitride is calculated, and this equivalent circle diameter can be defined as the average particle size.

In addition, the content rate of the cubic boron nitride can be obtained by measuring an area by performing binarization processing with the image analysis software on a reflected electron image obtained by measuring the CP-processed surface with the scanning electron microscope (SEM).

<Third Phase>

The sintered body of the present embodiment can further include a third phase, in addition to the first material and the cubic boron nitride described above. The third phase is preferably at least one selected from the group consisting of aluminum oxide, magnesium oxide, cerium oxide, yttrium oxide, hafnium oxide, and ZrO. When the sintered body includes the above-described third phase, sinterability is enhanced and the strength of the sintered body is further enhanced.

The above-described third phase preferably has an average particle size of 0.05 to 5 μm. When the average particle size is smaller than 0.05 μm, flocculation is likely to occur during mixing with other powders, and thus, poor sintering tends to occur. When the average particle size exceeds 5 μm, the strength tends to decrease due to grain growth during sintering.

In addition, the above-described third phase is preferably contained in the sintered body at a rate of 5 to 50 volume %. When the rate is less than 5 volume %, the strength of the sintered body is not sufficiently enhanced in some cases. When the rate exceeds 50 volume %, the rate of the high-hardness cBN may decrease and thus the hardness of the sintered body may decrease. The rate of the third phase is more preferably 10 to 30 volume %.

The average particle size of the third phase can be obtained as follows. Specifically, CP (Cross Section Polisher) processing is performed on the sintered body with an ion beam, to thereby form a smooth cross section. Then, the cross section is observed with the scanning electron microscope (SEM). By binarization processing with the image analysis software, an equivalent circle diameter of the third phase is calculated, and this equivalent circle diameter can be defined as the average particle size.

In addition, the content rate of the third phase can be obtained by identifying a region of the third phase, using a reflected electron image obtained by measuring the CP-processed surface with the scanning electron microscope (SEM) or using element analysis with Auger electron spectroscopy, and measuring an area by binarization processing with the image analysis software.

<Fourth Phase>

The sintered body of the present embodiment can further include a fourth phase, in addition to the first material and the cubic boron nitride described above. The fourth phase may be included in the sintered body together with the above-described third phase.

The above-described fourth phase is preferably at least one compound composed of at least one element selected from the group consisting of a group 4 element (such as Ti, Zr or Hf), a group 5 element (such as V, Nb or Ta) and a group 6 element (such as Cr, Mo or W) in the periodic table, Al, and Si, and at least one element selected from the group consisting of carbon, nitrogen and boron. When the sintered body includes the above-described fourth phase, sinterability is enhanced and the strength of the sintered body is further enhanced.

Specific examples of the above-described compound can include, for example, TiC, TiN, $TiB_2$, TiCrN, ZrC, ZrN, $ZrB_2$, AlCrN, AlN, $AlB_2$, SiC, $Si_3N_4$, HfC, HfN, VC, VN, NbC, TaC, CrC, CrN, $Cr_2N$, MoC, WC and the like. The fourth phase can be formed solely by one of these compounds, or by two or more of these compounds in combination.

The above-described fourth phase preferably has an average particle size of 0.05 to 5 μm. When the average particle size is smaller than 0.05 μm, flocculation is likely to occur during mixing with other powders, and thus, poor sintering tends to occur. When the average particle size exceeds 5 μm, the strength tends to decrease due to grain growth during sintering.

In addition, the above-described fourth phase is preferably contained in the sintered body at a rate of 5 to 50 volume %. When the rate is less than 5 volume %, the strength of the sintered body is not sufficiently enhanced in some cases. When the rate exceeds 50 volume %, a rate of high-hardness cBN may decrease and the hardness of the sintered body may decrease. The rate of the fourth phase is more preferably 10 to 30 volume %.

The average particle size of the fourth phase can be obtained as follows. Specifically, CP (Cross Section Polisher) processing is performed on the sintered body with an ion beam, to thereby form a smooth cross section. Then, the cross section is observed with the scanning electron microscope (SEM). By binarization processing with the image analysis software, an equivalent circle diameter of the fourth phase is calculated, and this equivalent circle diameter can be defined as the average particle size.

In addition, the content rate of the fourth phase can be obtained by identifying a region of the fourth phase, using a reflected electron image obtained by measuring the CP-processed surface with the scanning electron microscope (SEM) or using element analysis with Auger electron spectroscopy, and measuring an area by binarization processing with the image analysis software.

<Manufacturing Method>

The sintered body of the present embodiment can be manufactured by a conventionally known manufacturing method, and the manufacturing method is not particularly limited.

For example, the first material, cBN and the other components (such as, for example, the third phase particles and the fourth phase particles) are mixed as raw materials with a bead mill, a ball mill or the like. Then, the mixture is sintered for 10 to 60 minutes at a temperature of 1300 to 1700° C. and at a pressure of 10 MPa to 7 GPa, to thereby obtain the sintered body. Particularly, the mixture is preferably sintered at a pressure of 4 to 7 GPa. A sintering method is not particularly limited. However, discharge plasma sintering (SPS), hot pressing, ultrahigh pressure pressing and the like can be used.

<Cutting Tool>

Since the sintered body of the present embodiment shows properties such as excellent chipping resistance and wear resistance as described above, the sintered body of the present embodiment is suitably used in a cutting tool and the like. Namely, a cutting tool of the present embodiment includes the above-described sintered body.

Examples of the above-described cutting tool can include a drill, an end mill, a cutting edge indexable-type cutting tip for a drill, a cutting edge indexable-type cutting tip for an end mill, a cutting edge indexable-type cutting tip for milling, a cutting edge indexable-type cutting tip for turning, a metal saw, a gear cutting tool, a reamer, a tap, a cutting tool and the like.

The whole of the above-described cutting tool may be formed by the sintered body of the present embodiment, or only a part (e.g., cutting edge portion) thereof may be formed by the sintered body of the present embodiment. In addition, a coating film may be formed on a surface of the above-described cutting tool.

EXAMPLES

The present invention will be described in more detail below with reference to Examples. However, the present invention is not limited to these Examples.

Example 1

60 volume % of cBN and 40 volume % of a first material were prepared as raw materials. cBN had an average particle size of 2 μm. The first material was fabricated by the neutralization co-precipitation method as described below. The first material was partially-stabilized $ZrO_2$ in which 30 volume % of $Al_2O_3$ was in a solid solution state with respect to the whole of the first material, and the first material had a particle size of 0.01 μm.

(Fabrication of First Material (Precursor))

As described above, the first material can be fabricated by the following method, based on the paper (J. Jpn. Soc. Powder Powder Metallurgy, Vol. 60, No. 10, P428-435) published in 2013.

Specifically, zirconium oxychloride ($ZrOCl_2 \cdot 8H_2O$), aluminum chloride ($AlCl_3$) and yttrium chloride ($YCl_3$) are first added to water, to thereby prepare a mixed aqueous solution such that a molar ratio between $ZrO_2$ and $Y_2O_3$ is "$ZrO_2$:$Y_2O_3$=98.5:1.5" and a molar ratio between $ZrO_2$ having $Y_2O_3$ added thereto and $Al_2O_3$ is "($ZrO_2$ having $Y_2O_3$ added thereto):$Al_2O_3$=75:25".

Then, an ammonia aqueous solution is added to this mixed aqueous solution, and Zr, Y and Al are co-precipitated by simultaneous neutralization. The obtained precipitate is filtered and washed with water, and thereafter, is dried. An amorphous hydrated zirconia (75 mol % (98.5 mol % $ZrO_2$-1.5 mol % $Y_2O_3$)-25 mol % $Al_2O_3$) solid solution powder is thus prepared.

Next, the solid solution powder obtained in the above is calcined (heat-treated) under the conditions of 700° C., in the air and 9 hours, and is further calcined at 900° C. for 1 hour, to thereby obtain a crystalline $ZrO_2$ powder (in which $Al_2O_3$ and $Y_2O_3$ are in a solid solution state) which is the first material (precursor). This first material (precursor) is partially-stabilized $ZrO_2$ in which 30 volume % of $Al_2O_3$ is in a solid solution state with respect to the whole of the first material.

Subsequently, cBN and the first material (precursor) prepared in the above were mixed with a ball mill, to thereby obtain a mixture.

Next, the above-described mixture was divided into five equal parts and was sintered, with a pressure of 7 GPa and a sintering temperature shown in Table 1 being maintained for 15 minutes. Five types of sintered bodies, i.e., a sintered body No. 1 to a sintered body No. 5, were thus obtained.

Each of the sintered body No. 1 to the sintered body No. 5 thus obtained was subjected to CP processing as described above, and a cross section thereof was observed with the SEM at a magnification of not less than 10000 and not more than 150000, to thereby identify a position of presence of $Al_2O_3$ in the first material. In addition, by binarization processing with image analysis software (trademark: "WinROOF ver. 6.5.3" manufactured by Mitani Corporation), an equivalent circle diameter (particle size) and a contained amount of $Al_2O_3$ were calculated. As a result, it could be confirmed that the particle size was as shown in Table 1 below and the contained amount was almost equal to that of the raw material (30 volume % and the position of presence was in crystal grain boundaries or crystal grains). At the same time, the average particle size of cBN and the average particle size of the first material were checked. Then, it could be confirmed that the average particle size of cBN was equal to the average particle size of the raw material, while the particle size of $Al_2O_3$ in the first material varied depending on the sintering temperature.

In addition, as to the sintered body No. 1 to the sintered body No. 5, regions of cBN and the first material were identified using a reflected electron image obtained by measuring the CP-processed surface with the scanning electron microscope (SEM) or using element analysis with Auger electron spectroscopy, and areas were measured by binarization processing with the above-described image analysis software. Then, it could also be confirmed that each sintered body included the first material and cBN, and a rate between the first material and cBN was equal to the raw material ratio. As described above, the first material was partially-stabilized $ZrO_2$ including 30 volume % of $Al_2O_3$ dispersed in crystal grain boundaries or crystal grains of partially-stabilized $ZrO_2$.

Next, using each of the sintered body No. 1 to the sintered body No. 5, a cutting tool having a shape of CNMA120408, a negative land angle of 15° and a negative land width of 0.12 mm was fabricated, and a cutting test of high-speed cutting was conducted under the following cutting conditions.

(Cutting Conditions)
Cutting speed: 900 m/min
Feeding speed: 0.2 mm
Depth of cut: 0.3 mm
Wet/dry: wet (coolant: emulsion)
Device: LB4000 (manufactured by Okuma Corporation)
Workpiece: centrifugally cast iron (FC250 (gray cast iron) having dense pearlite, a dendrite structure or the like)
Shape of workpiece: cylindrical (outer diameter φ: 95 mm)

(Cutting Test)
A flank face wear amount (μm) after cutting of 10.0 km was measured, and a wear form and a chipping situation after cutting of 12.0 km were observed. The result is shown in Table 1.

As a comparative example, a sintered body No. 6 was fabricated and the same cutting test as above was conducted. The result is also shown in Table 1.

The sintered body No. 6 was fabricated as follows. Specifically, a powder of 60 volume % of cBN (the same as above), a powder of 34 volume % of $ZrO_2$ (average particle size: 0.05 μm), and a powder of 6 volume % of $Al_2O_3$ (average particle size: 2 μm) were prepared. The $ZrO_2$ powder and the $Al_2O_3$ powder were substitutes for the first material and the $ZrO_2$ powder did not include $Al_2O_3$ (in Table 1, the average particle size of the $Al_2O_3$ powder is shown in the section of the average particle size in the first material for the sake of convenience).

Then, these powders were mixed similarly to the above, and the mixture was sintered similarly to the above, except that the sintering temperature was 1400° C. The sintered body No. 6 was thus obtained.

TABLE 1

| Sintered body No. | Sintering temperature (° C.) | Particle size (μm) of $Al_2O_3$ in first material | Flank face wear amount (μm) after cutting of 10.0 km | Wear form and chipping situation after cutting of 12.0 km |
|---|---|---|---|---|
| 1 | 1350 | 0.02 | 152 | normal wear |
| 2 | 1400 | 0.05 | 155 | normal wear |
| 3 | 1500 | 0.1 | 158 | normal wear |
| 4 | 1600 | 0.5 | 160 | micro-chipping |
| 5 | 1700 | 1 | 162 | micro-chipping |
| 6 | 1400 | 2 | 166 | chipping |
| 7 | 1300 | 0.25 | 135 | chipping |
| 8 | 1350 | 0.3 | 134 | chipping |
| 9 | 1400 | 0.4 | 134 | chipping |
| 10 | 1500 | 0.6 | 132 | chipping |

As is clear from Table 1, it could be confirmed that the sintered bodies No. 1 to No. 5 of the example were smaller in flank face wear amount after cutting of 10.0 km and thus more excellent in wear resistance, and were also more excellent in wear form after cutting of 12.0 km and thus more excellent in chipping resistance, than the sintered body No. 6 of the comparative example.

When comparison was made among the sintered bodies No. 1 to No. 5, it could be confirmed that as the sintering temperature became lower, the average particle size of $Al_2O_3$ became smaller and both of the wear resistance and the chipping resistance became more excellent.

<Reference Experiment>

Four types of sintered bodies, i.e., a sintered body No. 7 to a sintered body No. 10, were obtained similarly to the above, except that only the first material (precursor) prepared in the above was used and the sintering temperature was set at the temperature shown in Table 1. Then, the cutting test was conducted similarly to the above.

The result of the particle size of $Al_2O_3$ measured similarly to the above and the result of the cutting test as to the sintered body No. 7 to the sintered body No. 10 are shown in Table 1 above.

As is clear from Table 1, as the sintering temperature became lower, the particle size of $Al_2O_3$ tended to become smaller. However, the particle size of $Al_2O_3$ in the sintered body No. 7 to the sintered body No. 10 was approximately five to ten times as large as the particle size of $Al_2O_3$ in the sintered body No. 1 to the sintered body No. 5 (i.e., the sintered bodies obtained by mixing and sintering the first material and cBN). In addition, chipping occurred in the sintered body No. 7 to the sintered body No. 10 after cutting of 12.0 km.

Based on the above, it could be confirmed that $Al_2O_3$ having an extremely small particle size was generated and the toughness was increased when the first material and cBN were mixed and sintered.

Example 2

Seven types of sintered bodies were fabricated (sintered bodies No. 3a, No. 3b, No. 3c, No. 3d, No. 3e, No. 3f, and No. 3g) similarly to the sintered body No. 3 (i.e., the sintering temperature was 1500° C.) in Example 1, except that the contained amount of the first material in the sintered body was changed as shown in Table 2 below.

Then, using these seven types of sintered bodies, the same cutting test as that of Example 1 was conducted. The result is shown in Table 2 below.

As to these seven types of sintered bodies, the position of presence of $Al_2O_3$ in the first material was identified, and the equivalent circle diameter (particle size) and the contained amount of $Al_2O_3$ were calculated, in accordance with the same method as that of Example 1. Then, it could be confirmed that these seven types of sintered bodies were similar to the sintered body No. 3 in Example 1. In addition, in accordance with the same method as that of Example 1, it was confirmed that the composition (the contained amount of the first material) of each sintered body was as shown in Table 2.

TABLE 2

| Sintered body No. | Contained amount (volume %) of first material | Flank face wear amount (μm) after cutting of 10.0 km | Wear form and chipping situation after cutting of 12.0 km |
|---|---|---|---|
| 3a | 10 | 180 | micro-chipping |
| 3b | 20 | 170 | micro-chipping |
| 3c | 30 | 163 | normal wear |
| 3 | 40 | 158 | normal wear |
| 3d | 50 | 151 | normal wear |
| 3e | 60 | 148 | normal wear |
| 3f | 80 | 135 | micro-chipping |
| 3g | 90 | 133 | chipping |

As is clear from Table 2, all sintered bodies showed excellent wear resistance and chipping resistance.

Example 3

Seven types of sintered bodies were fabricated (sintered bodies No. 3t, No. 3u, No. 3v, No. 3w, No. 3x, No. 3y, and No. 3z) similarly to the sintered body No. 3 in Example 1, except that the contained amount of $Al_2O_3$ in the first material was changed as shown in Table 3 below.

Among the above-described sintered bodies, the sintered body No. 3t was configured such that the first material is composed only of $Al_2O_3$ (i.e., composed of $Al_2O_3$ alone in which the contained amount of $Al_2O_3$ was 100 volume %), and TM-DAR manufactured by Taimei Chemicals Co., Ltd. was used as such $Al_2O_3$. In addition, the first material included in the other sintered bodies was prepared similarly to the first material in Example 1, except that although the same zirconium salt, aluminum salt and yttrium salt as those of Example 1 were used, a mixed aqueous solution was prepared such that the molar ratio between zirconia ($ZrO_2$) and yttria ($Y_2O_3$) was "$ZrO_2$:$Y_2O_3$=98.2:1.8 to 98.8:1.2" and the molar ratio between zirconia having yttria added thereto and alumina ($Al_2O_3$) (($ZrO_2$ having $Y_2O_3$ added thereto):$Al_2O_3$) was 10:90 (No. 3u), 30:70 (No. 3v), 50:50 (No. 3w), 55:45 (No. 3x), 75:25 (No. 3), 85:15 (No. 3y), and 95:5 (No. 3z), respectively.

Then, using these seven types of sintered bodies, the same cutting test as that of Example 1 was conducted. The result is shown in Table 3 below.

As to these seven types of sintered bodies, the position of presence of $Al_2O_3$ in the first material was identified, and the equivalent circle diameter (particle size) and the contained amount of $Al_2O_3$ were calculated, in accordance with the same method as that of Example 1. Then, it could be confirmed that these seven types of sintered bodies were similar to the sintered body No. 3 in Example 1 except for the contained amount of $Al_2O_3$. In addition, the composition of each sintered body was determined in accordance with the same method as that of Example 1. Then, it could be confirmed that these seven types of sintered bodies were similar to the sintered body No. 3 in Example 1 except for the contained amount of $Al_2O_3$.

The contained amount of $Al_2O_3$ in the first material was adjusted during preparation by the neutralization co-precipitation method as described above.

TABLE 3

| Sintered body No. | Contained amount (volume %) of $Al_2O_3$ in first material | Flank face wear amount (μm) after cutting of 10.0 km | Wear form and chipping situation after cutting of 12.0 km |
|---|---|---|---|
| 3t | 100 | chipping | chipping |
| 3u | 90 | 117 | chipping of cutting edge and damage of boundary wear portion |
| 3v | 70 | 124 | chipping of cutting edge |
| 3w | 55 | 130 | chipping of cutting edge |
| 3x | 50 | 146 | micro-chipping of cutting edge |
| 3 | 30 | 152 | normal wear |
| 3y | 15 | 158 | normal wear |
| 3z | 5 | 161 | normal wear |

As is clear from Table 3, the sintered bodies other than the sintered body No. 3t showed excellent wear resistance and chipping resistance. Particularly, the sintered bodies No. 3, No. 3x, No. 3y, and No. 3z in which the contained amount of $Al_2O_3$ in the first material was 5 to 50 volume % showed excellent chipping resistance, and the sintered bodies No. 3u, No. 3v and No. 3w in which the contained amount of $Al_2O_3$ in the first material was more than 50 volume % and not more than 90 volume % showed excellent wear resistance.

Example 4

24 types of sintered bodies were fabricated (sintered bodies No. 301 to No. 324) similarly to the sintered body No. 3 in Example 1, except that the first material (contained amount: 40 volume %) in the sintered body was replaced with 23 volume % of the first material and 17 volume % of the third phase and/or the fourth phase shown in Table 4.

Then, using these 24 types of sintered bodies, the same cutting test as that of Example 1 was conducted. The result is shown in Table 4 below.

As to these 24 types of sintered bodies, the position of presence of $Al_2O_3$ in the first material was identified, and the equivalent circle diameter (particle size) and the contained amount of $Al_2O_3$ were calculated, in accordance with the same method as that of Example 1. Then, it could be confirmed that these 24 types of sintered bodies were similar to the sintered body No. 3 in Example 1.

In addition, regions of cBN, the first material, the third phase, and the fourth phase were identified using a reflected electron image obtained by measuring the CP-processed surface of each sintered body with the scanning electron microscope (SEM) or using element analysis with Auger electron spectroscopy, and areas were measured by binarization processing with the above-described image analysis software. Then, it could be confirmed that the composition and the contained amount of each of cBN, the first material, the third phase, and the fourth phase were the same as those described above and those shown in Table 4.

TABLE 4

| Sintered body No. | Third phase (volume %) | | | | | | Fourth phase (volume %) | | | | |
|---|---|---|---|---|---|---|---|---|---|---|---|
| | $Al_2O_3$ | CeO | MgO | HfO | $Y_2O_3$ | ZrO | HfC | VC | NbN | TaN | $Cr_2N$ |
| 301 | 17 | — | — | — | — | — | — | — | — | — | — |
| 302 | — | — | — | — | — | — | — | — | — | — | — |
| 303 | — | — | — | — | — | — | — | — | — | — | — |
| 304 | — | — | — | — | — | — | — | — | — | — | — |
| 305 | — | — | — | — | — | — | — | — | — | — | — |
| 306 | — | — | — | — | — | — | — | — | — | — | — |
| 307 | 10 | — | — | — | — | — | — | — | — | — | — |
| 308 | 10 | — | — | — | — | — | — | — | — | — | — |
| 309 | 10 | — | — | — | — | — | — | — | — | — | — |
| 310 | — | — | — | — | — | — | — | — | — | — | — |
| 311 | 10 | 7 | — | — | — | — | — | — | — | — | — |
| 312 | 10 | — | 7 | — | — | — | — | — | — | — | — |
| 313 | 10 | — | — | 7 | — | — | — | — | — | — | — |
| 314 | — | — | — | — | — | — | — | — | — | — | — |
| 315 | — | — | — | — | — | — | — | — | — | — | — |
| 316 | 10 | — | — | — | 7 | — | — | — | — | — | — |
| 317 | — | — | — | — | — | 17 | — | — | — | — | — |
| 318 | — | — | — | — | — | — | 17 | — | — | — | — |
| 319 | — | — | — | — | — | — | — | 17 | — | — | — |
| 320 | — | — | — | — | — | — | — | — | 17 | — | — |
| 321 | — | — | — | — | — | — | — | — | — | 17 | — |
| 322 | — | — | — | — | — | — | — | — | — | — | 17 |

TABLE 4-continued

| Sintered body No. | MoN | WC | TiCrN | AlCrN | ZrC | ZrN | TiC | TiN | Si$_3$N$_4$ | Flank face wear amount (μm) after cutting of 10.0 km | Wear form and chipping situation after cutting of 12.0 km |
|---|---|---|---|---|---|---|---|---|---|---|---|
| 323 | — | — | — | — | — | — | — | — | — | — | — |
| 324 | 10 | — | — | — | — | 7 | — | — | — | — | — |
| 301 | — | — | — | — | — | — | — | — | — | 143 | micro-chipping |
| 302 | — | — | — | 17 | — | — | — | — | — | 145 | normal wear |
| 303 | — | — | — | — | 17 | — | — | — | — | 160 | chipping |
| 304 | — | — | — | — | — | 17 | — | — | — | 162 | chipping |
| 305 | — | — | — | — | — | — | 17 | — | — | 150 | normal wear |
| 306 | — | — | — | — | — | — | — | 17 | — | 156 | chipping |
| 307 | — | — | — | 7 | — | — | — | — | — | 142 | normal wear |
| 308 | — | — | — | — | — | — | 7 | — | — | 147 | normal wear |
| 309 | — | — | — | 5 | — | — | 2 | — | — | 145 | normal wear |
| 310 | — | — | — | 10 | — | — | 7 | — | — | 148 | normal wear |
| 311 | — | — | — | — | — | — | — | — | — | 157 | normal wear |
| 312 | — | — | — | — | — | — | — | — | — | 155 | micro-chipping |
| 313 | — | — | — | — | — | — | — | — | — | 158 | micro-chipping |
| 314 | — | — | 17 | — | — | — | — | — | — | 160 | micro-chipping |
| 315 | — | — | — | — | — | — | — | — | 17 | 165 | micro-chipping |
| 316 | — | — | — | — | — | — | — | — | — | 155 | normal wear |
| 317 | — | — | — | — | — | — | — | — | — | 166 | micro-chipping |
| 318 | — | — | — | — | — | — | — | — | — | 164 | micro-chipping |
| 319 | — | — | — | — | — | — | — | — | — | 160 | micro-chipping |
| 320 | — | — | — | — | — | — | — | — | — | 163 | micro-chipping |
| 321 | — | — | — | — | — | — | — | — | — | 159 | normal wear |
| 322 | 17 | — | — | — | — | — | — | — | — | 167 | micro-chipping |
| 323 | — | 17 | — | — | — | — | — | — | — | 165 | micro-chipping |
| 324 | — | — | — | — | — | — | — | — | — | 152 | micro-chipping |

As is clear from Table 4, all sintered bodies showed excellent wear resistance and chipping resistance.

Example 5

Six types of sintered bodies were fabricated similarly to the sintered body No. 3 in Example 1, except that the first material (contained amount: 40 volume %) in the sintered body was replaced with a first material (1) to a first material (6) described below, respectively.

[First Material (1)]

A partially-stabilized ZrO$_2$ powder (trademark: "TZ-3Y" manufactured by Tosoh Corporation, average particle size: 45 nm) and an Al$_2$O$_3$ powder (trademark: "TM-DAR" manufactured by Taimei Chemicals Co., Ltd., average particle size: 0.1 μm) were mixed in a solvent (ethanol) with a ball mill, to thereby obtain mixed slurry. The powders were mixed such that a content rate of ZrO$_2$ in the sintered body was 34 volume % and a content rate of Al$_2$O$_3$ in the sintered body was 6 volume % (a rate of Al$_2$O$_3$ in the first material was 15 volume %).

Then, the mixed slurry obtained in the above was granulated (spray-granulated) with a spray dryer (trademark: "FR125" manufactured by PRECI Co., Ltd.), to thereby obtain a granulated powder.

Next, this granulated powder was sintered under the conditions of "1000° C., in the vacuum and 3 hours" using a heat treatment furnace, to thereby obtain the first material (1) which is a granulated product having increased strength.

[First Material (2)]

The first material (2) was obtained similarly to the first material (1), except that the partially-stabilized ZrO$_2$ powder and the Al$_2$O$_3$ powder were mixed such that the content rate of ZrO$_2$ in the sintered body was 28 volume % and the content rate of Al$_2$O$_3$ in the sintered body was 12 volume % (the rate of Al$_2$O$_3$ in the first material was 30 volume %).

[First Material (3)]

The first material (3) was obtained similarly to the first material (1), except that the partially-stabilized ZrO$_2$ powder and the Al$_2$O$_3$ powder were mixed such that the content rate of ZrO$_2$ in the sintered body was 20 volume % and the content rate of Al$_2$O$_3$ in the sintered body was 20 volume % (the rate of Al$_2$O$_3$ in the first material was 50 volume %).

[First Material (4)]

The partially-stabilized ZrO$_2$ powder (trademark: "TZ-3Y" manufactured by Tosoh Corporation, average particle size: 45 nm) and the Al$_2$O$_3$ powder (trademark: "TM-DAR" manufactured by Taimei Chemicals Co., Ltd., average particle size: 0.1 μm) were mixed with a ball mill in a solvent (ethanol) having 10 mass % of polyvinyl butyral (trademark: "S-LEC B" manufactured by Sekisui Chemical Co., Ltd.) added thereto as a binder, to thereby obtain mixed slurry. The powders were mixed such that the content rate of ZrO$_2$ in the sintered body was 34 volume % and the content rate of Al$_2$O$_3$ in the sintered body was 6 volume % (the rate of Al$_2$O$_3$ in the first material was 15 volume %).

Then, the mixed slurry obtained in the above was granulated (spray-granulated) with the spray dryer (trademark: "FR125" manufactured by PRECI Co., Ltd.), to thereby obtain a granulated powder, and this was used as the first material (4).

[First Material (5)]

The first material (5) was obtained similarly to the first material (4), except that the partially-stabilized ZrO$_2$ powder and the $Al_2O_3$ powder were mixed such that the content rate of $ZrO_2$ in the sintered body was 28 volume % and the content rate of $Al_2O_3$ in the sintered body was 12 volume % (the rate of $Al_2O_3$ in the first material was 30 volume %).

[First Material (6)]

The first material (6) was obtained similarly to the first material (4), except that the partially-stabilized $ZrO_2$ powder and the $Al_2O_3$ powder were mixed such that the content rate of $ZrO_2$ in the sintered body was 20 volume % and the content rate of $Al_2O_3$ in the sintered body was 20 volume % (the rate of $Al_2O_3$ in the first material was 50 volume %).

Then, using the six types of sintered bodies obtained as described above, the same cutting test as that of Example 1 was conducted. The result is shown in Table 5 below.

As to these six types of sintered bodies, the position of presence of $Al_2O_3$ in the first material was identified, and the equivalent circle diameter (particle size) and the contained amount of $Al_2O_3$ were calculated, in accordance with the same method as that of Example 1. Then, it was confirmed that the particle size of the first material was almost 0.15 µm, the particle size of $Al_2O_3$ was 0.1 µm, and the content rates of $ZrO_2$ and $Al_2O_3$ in the sintered body were almost as described above.

In addition, regions of cBN, $ZrO_2$ and $Al_2O_3$ were identified using a reflected electron image obtained by measuring the CP-processed surface of each sintered body with the scanning electron microscope (SEM) or using element analysis with Auger electron spectroscopy, and areas were measured by binarization processing with the above-described image analysis software. Then, it could be confirmed that the composition and the contained amount of each of cBN, $ZrO_2$ and $Al_2O_3$ were almost the same as those when the raw materials were blended.

TABLE 5

| Type of first material | Flank face wear amount (µm) after cutting of 10.0 km | Wear form and chipping situation after cutting of 12.0 km |
| --- | --- | --- |
| first material (1) | 170 | micro-chipping |
| first material (2) | 166 | micro-chipping |
| first material (3) | 163 | micro-chipping |
| first material (4) | 175 | micro-chipping |
| first material (5) | 172 | micro-chipping |
| first material (6) | 170 | micro-chipping |

As is clear from Table 5, all sintered bodies showed excellent wear resistance and chipping resistance.

Example 6

A sintered body was fabricated (this sintered body will be referred to as "sintered body No. 601" for the sake of convenience) similarly to the sintered body No. 3 in Example 1, except that the first material in the sintered body was replaced with a first material fabricated as follows (this first material will be referred to as "first material A" for the sake of convenience) (i.e., the first material precursor in the raw materials of the sintered body was replaced with "first material A" described below).

(Fabrication of First Material A)

As described above, the first material A can be fabricated by the following method (sol-gel method), based on the paper (J. Jpn. Soc. Powder Power Metallurgy, Vol. 58, No. 12, P727-732) published in 2011.

Specifically, $Zr-i-(OC_3H_7)_4$, $Al(OC_3H_7)_3$ and $Y(OC_3H_7)_3$ are first treated in 2-propanol for 2 hours, and thereafter, $NH_4OH$ is added. Then, reflux is performed at 78° C. for 24 hours, to thereby obtain a hydrolyzed product. Next, this hydrolyzed product is centrifugally separated, and thereafter, is washed with hot water.

Subsequently, the product washed in the above is dried at 120° C. in the vacuum, to thereby obtain a precursor. Blending is performed such that a blending ratio of $Y_2O_3$ to $ZrO_2$ is 1.5 mol % and a blending ratio of $Al_2O_3$ to $ZrO_2$ is 25 mol %. The precursor (powder) obtained as described above is calcined (heat-treated) under the conditions of 700° C., in the air and 9 hours, and further, is calcined at 900° C. for 1 hour, to thereby obtain a crystalline $ZrO_2$ (in which $Al_2O_3$ and $Y_2O_3$ are in a solid solution state) powder which is the first material A. This first material A is partially-stabilized $ZrO_2$ in which 30 volume % of $Al_2O_3$ is in a solid solution state with respect to the whole of the first material.

On the other hand, 16 types of sintered bodies were fabricated (sintered bodies No. 602 to No. 617) similarly to the sintered body No. 601, except that the first material A (contained amount: 40 volume %) in the above-described sintered body No. 601 was replaced with 23 volume % of the first material A and 17 volume % of the third phase and/or the fourth phase shown in Table 6.

Then, using these 17 types of sintered bodies, the same cutting test as that of Example 1 was conducted. The result is shown in Table 6 below.

As to these 17 types of sintered bodies, the position of presence of $Al_2O_3$ in the first material was identified, and the equivalent circle diameter (particle size) and the contained amount of $Al_2O_3$ were calculated, in accordance with the same method as that of Example 1. Then, it could be confirmed that these 17 types of sintered bodies were similar to the sintered body No. 3 in Example 1.

In addition, regions of cBN, the first material, the third phase, and the fourth phase were identified using a reflected electron image obtained by measuring the CP-processed surface of each sintered body with the scanning electron microscope (SEM) or using element analysis with Auger electron spectroscopy, and areas were measured by binarization processing with the above-described image analysis software. Then, it could be confirmed that the composition and the contained amount of each of cBN, the first material, the third phase, and the fourth phase were the same as those described above and those shown in Table 6.

TABLE 6

| Sintered body No. | Third phase (volume %) | | | | | Fourth phase (volume %) | | | | | | | Flank face wear amount (μm) after cutting of 10.0 km | Wear form and chipping situation after cutting of 12.0 km |
|---|---|---|---|---|---|---|---|---|---|---|---|---|---|---|
| | Al₂O₃ | CeO | MgO | HfO | ZrO | TiCrN | AlCrN | ZrC | ZrN | TiC | TiN | Si₃N₄ | | |
| 601 | — | — | — | — | — | — | — | — | — | — | — | — | 155 | normal wear |
| 602 | 17 | — | — | — | — | — | — | — | — | — | — | — | 141 | micro-chipping |
| 603 | — | — | — | — | — | — | 17 | — | — | — | — | — | 143 | normal wear |
| 604 | — | — | — | — | — | — | — | 17 | — | — | — | — | 160 | chipping |
| 605 | — | — | — | — | — | — | — | — | 17 | — | — | — | 161 | chipping |
| 606 | — | — | — | — | — | — | — | — | — | 17 | — | — | 150 | normal wear |
| 607 | — | — | — | — | — | — | — | — | — | — | 17 | — | 153 | chipping |
| 608 | 10 | — | — | — | — | — | 7 | — | — | — | — | — | 140 | normal wear |
| 609 | 10 | — | — | — | — | — | — | — | 7 | — | — | — | 145 | normal wear |
| 610 | 10 | — | — | — | — | — | 5 | — | 2 | — | — | — | 144 | normal wear |
| 611 | — | — | — | — | — | — | 10 | — | 7 | — | — | — | 146 | normal wear |
| 612 | 10 | 7 | — | — | — | — | — | — | — | — | — | — | 155 | normal wear |
| 613 | 10 | — | 7 | — | — | — | — | — | — | — | — | — | 153 | micro-chipping |
| 614 | 10 | — | — | 7 | — | — | — | — | — | — | — | — | 157 | micro-chipping |
| 615 | — | — | — | — | — | 17 | — | — | — | — | — | — | 160 | micro-chipping |
| 616 | — | — | — | — | — | — | — | — | — | — | — | 17 | 164 | micro-chipping |
| 617 | 10 | — | — | — | 7 | — | — | — | — | — | — | — | 150 | micro-chipping |

As is clear from Table 6, all sintered bodies showed excellent wear resistance and chipping resistance.

While the embodiment and examples of the present invention have been described above, the configurations of the embodiment and examples described above are intended to be combined as appropriate or modified in various manners from the beginning.

It should be understood that the embodiment disclosed herein is illustrative and non-restrictive in every respect. The scope of the present invention is defined by the terms of the claims, rather than the embodiment described above, and is intended to include any modifications within the meaning and scope equivalent to the terms of the claims.

The invention claimed is:

1. A sintered body comprising a first material and cubic boron nitride,
the first material being partially-stabilized $ZrO_2$ including 5 to 90 volume % of $Al_2O_3$ with respect to the whole of the first material, the $Al_2O_3$ being dispersed in crystal grain boundaries or crystal grains of partially-stabilized $ZrO_2$.

2. The sintered body according to claim 1, wherein the first material is partially-stabilized $ZrO_2$ including 5 to 50 volume % of $Al_2O_3$ with respect to the whole of the first material, the $Al_2O_3$ being dispersed in crystal grain boundaries or crystal grains of partially-stabilized $ZrO_2$.

3. The sintered body according to claim 1, wherein the first material is partially-stabilized $ZrO_2$ including more than 50 volume % and not more than 70 volume % of $Al_2O_3$ with respect to the whole of the first material, the $Al_2O_3$ being dispersed in crystal grain boundaries or crystal grains of partially-stabilized $ZrO_2$.

4. The sintered body according to claim 1, wherein the first material is partially-stabilized $ZrO_2$ including more than 70 volume % and not more than 90 volume % of $Al_2O_3$ with respect to the whole of the first material, the $Al_2O_3$ being dispersed in crystal grain boundaries or crystal grains of partially-stabilized $ZrO_2$.

5. The sintered body according to claim 1, wherein the $Al_2O_3$ is a particle having a particle size of not larger than 1 μm.

6. The sintered body according to claim 5, wherein the $Al_2O_3$ is a particle having a particle size of not larger than 0.5 μm.

7. The sintered body according to claim 6, wherein the $Al_2O_3$ is a particle having a particle size of not larger than 0.1 μm.

8. The sintered body according to claim 1, wherein the sintered body includes 20 to 80 volume % of the first material.

9. The sintered body according to claim 1, further comprising a third phase, wherein
the third phase is at least one selected from the group consisting of aluminum oxide, magnesium oxide, cerium oxide, yttrium oxide, hafnium oxide, and ZrO.

10. The sintered body according to claim 1, further comprising a fourth phase, wherein
the fourth phase is at least one compound composed of at least one element selected from the group consisting of a group 4 element, a group 5 element and a group 6 element in a periodic table, Al, and Si, and at least one element selected from the group consisting of carbon, nitrogen and boron.

11. A cutting tool comprising the sintered body as recited in claim 1.

* * * * *